United States Patent
Hirabayashi et al.

(10) Patent No.: US 6,722,992 B2
(45) Date of Patent: Apr. 20, 2004

(54) TORQUE LIMITER AND REEL MOUNT

(75) Inventors: Koichiro Hirabayashi, Osaka (JP); Akio Konishi, Hyogo (JP); Kazuo Shibukawa, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 10/157,006

(22) Filed: May 29, 2002

(65) Prior Publication Data

US 2002/0179393 A1 Dec. 5, 2002

(30) Foreign Application Priority Data

May 29, 2001 (JP) ........................................ 2001-160304

(51) Int. Cl.[7] ............................. G11B 15/30; F16D 7/00
(52) U.S. Cl. ........................... 464/29; 464/30; 384/121
(58) Field of Search ............................. 192/56.4, 56.41, 192/84.3, 113.34, 113.36, 110 B; 464/29, 30, 45; 384/121, 123, 124, 425

(56) References Cited

U.S. PATENT DOCUMENTS 5,052,822 A * 10/1991 Van Beek .................... 384/123
5,445,338 A * 8/1995 Nakase ........................ 242/349
5,481,418 A * 1/1996 Maikuma et al. ............. 360/85
5,765,950 A * 6/1998 Eno et al. ..................... 384/97
2002/0183120 A1 * 12/2002 Hirabayashi et al. ......... 464/29

FOREIGN PATENT DOCUMENTS

JP          06223446 A   *  8/1994   ........... G11B/15/30

* cited by examiner

Primary Examiner—Richard M. Lorence
(74) Attorney, Agent, or Firm—Renner Otto Boisselle & Sklar LLP

(57) ABSTRACT

A torque limiter of the present invention includes: a first rotor and a second rotor, the first and second rotors rotatable about a single center of rotation; a yoke board integrally formed with the first rotor; a magnet which is provided so as to be in contact with the yoke board; and a hysteresis board provided so as to be opposed to the magnet with a space therebetween, the hysteresis board is integrally formed with the second rotor and a washer having depression portions, protrusion portions, holes, or a combination thereof is provided between the first and second rotors.

8 Claims, 8 Drawing Sheets

TORQUE LIMITER AND REEL MOUNT

BACKGROUND OF THE INVENTION

1. Field of the Invention

The present invention relates to a torque limiter which is used as, for example, a reel mount used for a magnetic recording/reproducing apparatus, such as a videotape or audiotape recorder.

2. Description of the Related Art

Referring to FIGS. 9 through 11, a structure of a conventional torque limiter which is used as a reel mount will be described below.

The "torque limiter" described herein is a reel mount on which a reel in a cassette is mounted, the torque on the reel when mounted being limited (controlled) by the torque limiter. As such, the terms "torque limiter" and "reelmount" are interchangeably used in this description.

FIG. 9 is a top view of a conventional torque limiter. FIG. 10 is a cross-sectional view of the conventional torque limiter taken along line B—B shown in FIG. 9. FIG. 11 is a top view of a lower reel mount member of the conventional torque limiter shown in FIG. 9.

In FIG. 10, reference numeral 1a denotes a reel in a cassette. A (magnetic) tape (not shown) is wound around the reel 1a. Reference numeral 1b denotes a body of the cassette, reference numeral 2 denotes a chassis of a conventional magnetic recording/reproducing apparatus, such as a videotape or audiotape recorder, used for recording/reproducing information to/from the magnetic tape of the cassette, and reference numeral 3 denotes a rotation shaft provided in the chassis 2. The conventional torque limiter is placed on the rotation shaft 3 so as to be rotatable with respect to an axis of the rotation shaft 3 (shown as a broken line in FIG. 10). Reference numeral 303 denotes an upper reel mount member on which the reel 1a is mounted. Reference numeral 305 denotes a rotation engagement member which is movable up and down (i.e., in a direction parallel to the axis of the rotation shaft 3) and is engaged with the upper reel mount member 303 and the reel 1a along a rotation direction of the conventional torque limiter, reference numeral 304 denotes a spring which applies upward force to the rotation engagement member 305 with respect to the movement thereof such that the rotation engagement member 305 is engaged with a protruded portion of the upper reel mount member 303 and is supported by the upper reel mount member 303 and the spring 304, and reference numeral 307 denotes a yoke board provided in the form of a disk and made of a ferromagnet, such as a rolled steel board.

The yoke board 307is integrally formed with the upper reel mount member 303. It is common practice in the field of magnetic recording/reproducing apparatuses to integrally form a yoke board member, such as the yoke board 307, with an upper reel mount member, such as the upper reel mount member 303, by outsert molding. The upper reel mount member 303 integrally formed with the yoke board 307 is rotatable with respect to the axis of the rotation shaft 3. The integral upper reel mount member 303 and yoke board 307 together form a first rotor of the conventional reel mount. Reference numeral 308 denotes a magnet which applies magnetic force so that the magnet 308 is attached to and rotated with the yoke board 307 due to rotation of the upper reel mount member 303. Lines of magnetic force (not shown) generated by the magnet 308 form a magnetic loop passing through the yoke board 307.

Reference numeral 310 denotes a lower reel mount member (a second rotor) integrally formed with a hysteresis board 311 having a disk-like shape. The hysteresis board 311 is made of a material having large magnetic hysteresis loss. It is common practice in the field of magnetic recording/reproducing apparatuses to integrally form a hysteresis board member, such as the hysteresis board 311, with a lower reel mount member, such as the lower reel mount member 310, by outsert molding. Similar to the upper reel mount member 303, the lower reel mount member 310 integrally formed with the hysteresis board 311 is placed on the rotation shaft 3 so as to be rotatable with respect to the axis of the rotation shaft 3. The lower reel mount member 310 is attracted by the magnetic force generated by the magnet 308 so as to be in contact with the upper reel mount member 303.

Reference numeral 309 denotes a washer sandwiched between the lower reel mount member 310 integrally formed with the hysteresis board 311 and the upper reel mount member 303. The washer 309 is engaged with the lower reel mount member 310 so as to be rotated therewith. Reference numeral 302 denotes a gear member provided to the outer circumference of the lower reel mount member 310, which is engaged with an external gear (not shown). Reference numeral 306 denotes a reel bearing member provided on the upper reel mount member 303 and integrally formed with the yoke board 307 so as to come into contact with the reel 1a when the reel 1a is mounted on the conventional reel mount. Similar to the other reel mount members, it is common practice in the field of magnetic recording/reproducing apparatuses to integrally form a reel bearing member, such as the reel bearing member 306, with a yoke board member, such as the yoke board 307, by outsert molding.

When the reel 1a is mounted on the conventional torque limiter, a position in a vertical direction of the reel 1a with respect to the chassis 2 is defined by the reel bearing member 306. Reference numeral 4 denotes a chassis washer placed between the reel mount and the base of the rotation shaft 3 so as to define a space between the chassis 2 and the lower reel mount member 310. Reference numeral 5 denotes a shaft washer placed on the rotation shaft 3 so as to define movement of the reel mount along a thrust (vertical) direction of the reel mount and to provide a space between the rotation shaft 3 and the upper reel mount member 303.

As shown in FIG. 11, like ordinary washers, the washer 309 has a flat and even surface, however the washer 309 is provided with depression portions 309a at the inner circumference thereof unlike ordinary washers. Each depression portion 309a is engaged with a protrusion portion 310a provided on the lower reel mount member 310 such that the washer 309 is rotated with the lower reel mount member 310. Usually, grease or oil is applied to the washer 309 so as to stabilize clutch torque (discussed below) generated by the conventional torque limiter.

Operation of the conventional torque limiter is described below.

When the lower reel mount member 310 is rotated by the external gear through engagement with the gear member 302, friction torque is generated between the upper and lower reel mount members 303 and 310 via the washer 309 due to the magnetic attraction generated by the magnet 308 on the lower and upper parts of the reel mount. Simultaneously, the hysteresis board 311 is rotated through the magnetic loop generated by the magnet 308, so that magnetic hysteresis torque is generated. The friction torque and magnetic hysteresis torque result in clutch torque between the upper reel mount member 303 and the lower reel mount member 310 so that the reel 1a mounted on the upper reel mount member 303 is rotated by the rotation engagement member 305 while sufficient tension is applied to the magnetic tape wound around the reel 1a.

However, in the conventional torque limiter, it is difficult to generate stable clutch torque. Clutch torque generated by a torque limiter is always required to be stable without being affected by various disturbances in order to provide reliable and stable operation of the torque limiter. Specifically, the clutch torque must be stable even if there are variations in the rotating speed of the reel mount, the environmental temperature or humidity, the operating time of the reel mount, etc. Friction torque, which contributes to the clutch torque generated by the conventional torque limiter, is affected by the stability of a coefficient of friction between the washer 309 and the upper reel mount member 303. The coefficient of friction is determined by a value of a physical property peculiar to the materials used for the washer 309. Further, the coefficient of friction is greatly affected by a surface condition of the washer 309, an amount of grease applied to the washer 309, the way the washer 309 is smeared with the grease (e.g., whether or not the grease is uniformly applied to the washer 309), etc. Further still, the coefficient of friction varies according to variations in the rotating speed of the reel mount, the environmental temperature or humidity, the operating time of the reel mount, etc.

In the conventional torque limiter, since the surface of the washer 309 is flat, the washer 309 can become stuck to the surface of the upper reel mount member 303 and as such grease does not adhere well to the washer 309, so that the grease applied to the washer 309 is easily expended during operation of the torque limiter, thereby varying the friction torque. Furthermore, the washer 309 is worn through long-time use, such that fragments of the washer 309 are present between and pressed against the contact surfaces of the washer 309 and the upper reel mount member 303, which cause variations in the friction torque and may cause damage to the elements of the conventional torque limiter.

The present invention provides solutions to the above-described problems of the conventional torque limiter as described below.

SUMMARY OF THE INVENTION

According to one aspect of the present invention, there is provided a torque limiter which includes: a first rotor and a second rotor, the first and second rotors rotatable about a single center of rotation; a yoke board integrally formed with the first rotor; a magnet which is provided so as to be in contact with the yoke board; and a hysteresis board provided so as to be opposed to the magnet with a space therebetween, in which the hysteresis board is integrally formed with the second rotor and a washer having depression portions, protrusion portions, holes, or a combination thereof is provided between the first and second rotors.

In this torque limiter structure of the present invention, the washer is provided with depression portions, protrusion portions, holes, or combinations thereof so as to stabilize the coefficient of friction of the washer, thereby providing stable clutch torque.

In one embodiment of the present invention, first and second washers are provided between the first and second rotors and at least one of the first and second washers has depression portions, protrusion portions, holes, or a combination thereof on the surface of the at least one of the first and second washers.

In this torque limiter structure of the present invention, the surface of at least one of the two washers is provided with depression portions, protrusion portions, holes, or combinations thereof so as to stabilize the coefficient of friction of the washer, thereby providing stable clutch torque.

In one embodiment of the present invention, the first washer is made of a resin-based material and the second washer is made of a metal-based material.

In this torque limiter structure of the present invention, the surface of at least one of the washers is provided with depression portions, protrusion portions, holes, or combinations thereof, and the washer made of a metal-based material and the other washer made of a resin-based material are in contact with each other while being rotated, thereby providing superior stable clutch torque.

In one embodiment of the present invention, at least one of the first and second washers is made of any one of polyethylene, UHMW polyethylene, POM, FR, PET, PA, PPS, PBT, PI and PEEK.

In this structure, at least one of the washers is provided with depression portions, protrusion portions, holes, or combinations thereof on the surface of the at least one of the washers and is made of any one of polyethylene, UHMW polyethylene, POM, FR, PET, PA, PPS, PBT, PI and PEEK and the other washer is made of a metal-based material, both washers being in contact with each other while being rotated, thereby providing superior stable clutch torque.

In one embodiment of the present invention, grease or oil is provided between the first and second washers substantially in a gap provided between the surfaces of the first and second washers.

In one embodiment of the present invention, the magnet is provided with a protrusion portion which interlocks with an engagement portion of the washer so as to provide engagement of the washer with the first rotor through the contact of the magnet and the first rotor.

In one embodiment of the present invention, the second rotor is provided with a protrusion portion which interlocks with an engagement portion of the second washer so as to provide engagement of the second washer with the second rotor.

In one embodiment of the present invention, the torque limiter is provided on a rotation shaft in a chassis of a magnetic recording/reproducing apparatus for recording/reproducing information to/from a magnetic tape of a cassette, the first and second rotors being rotatable with respect to the rotation shaft.

Thus, the invention described herein makes possible the advantages of providing a torque limiter which generates stable clutch torque and therefore provides reliable and stable operation for use with a magnetic recording/reproducing apparatus.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described with reference to the drawings.

EXAMPLE 1

Figure 1:
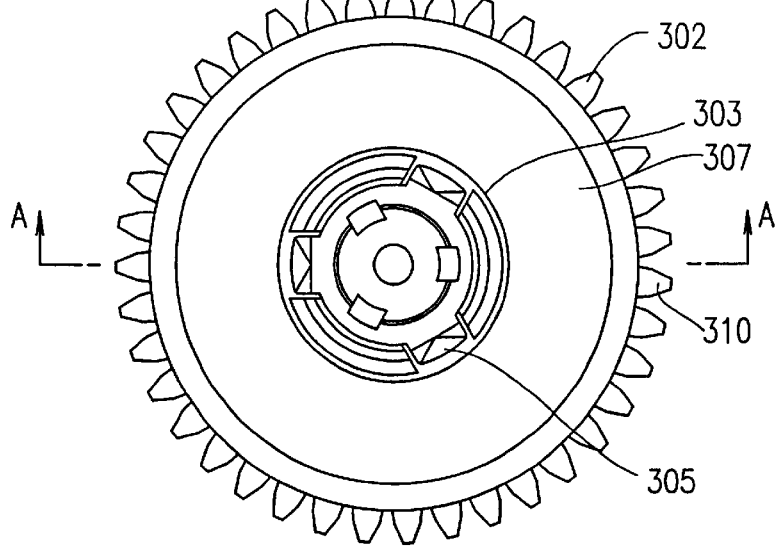
FIG. 1 is a top view of a torque limiter according to Example 1 of the present invention.
Figure 2:
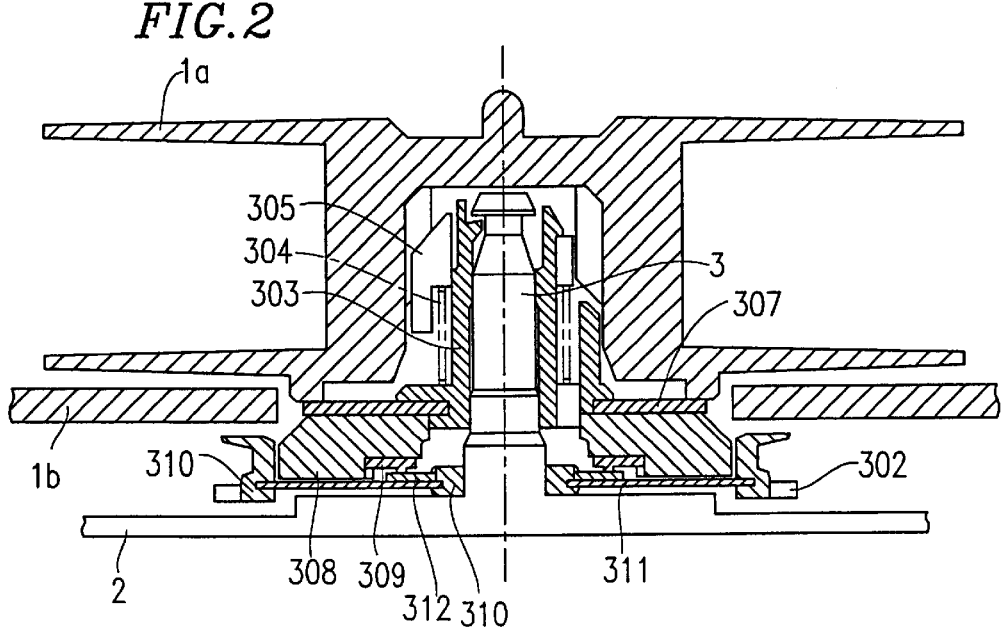
FIG. 2 is a cross sectional view of the torque limiter according to Example 1 of the present invention taken along line A—A shown in FIG. 1.
Figure 3:
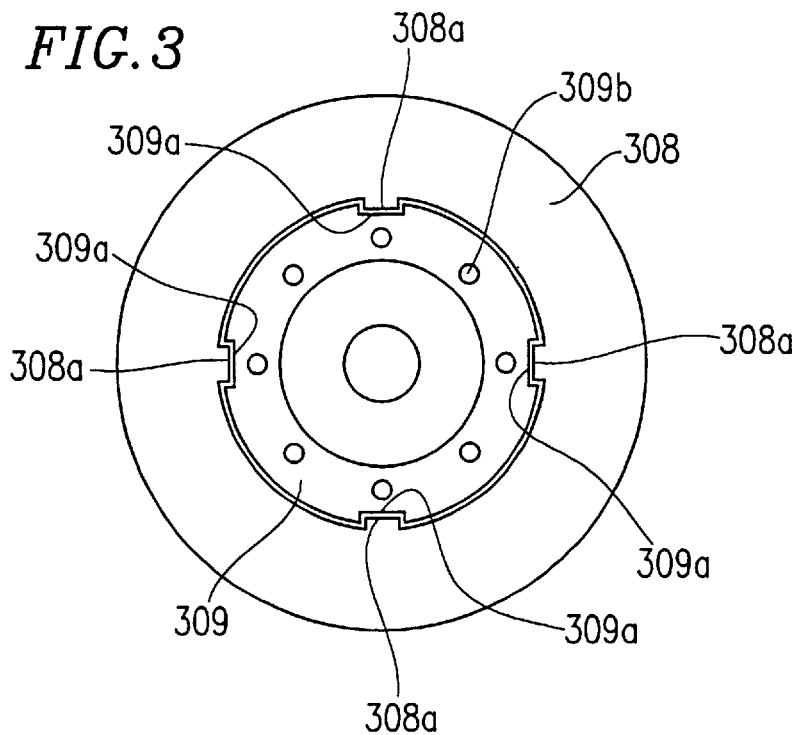
FIG. 3 is a backside view of an upper reel mount member of the torque limiter according to Example 1 of the present invention.
Figure 4:
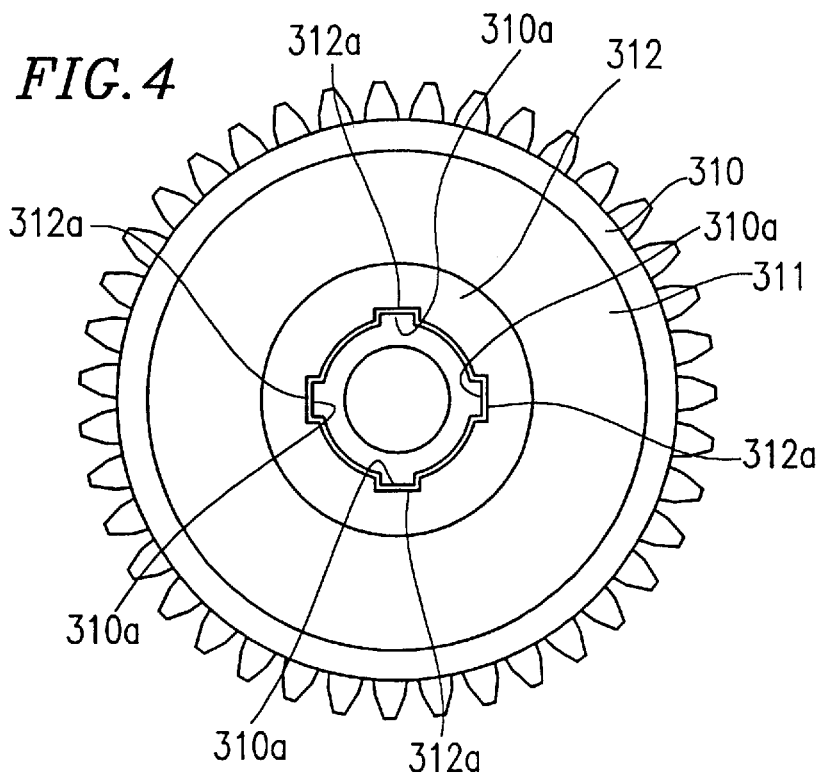
FIG. 4 is a top view of a lower reel mount member of the torque limiter according to Example 1 of the present invention.
Figure 5A:
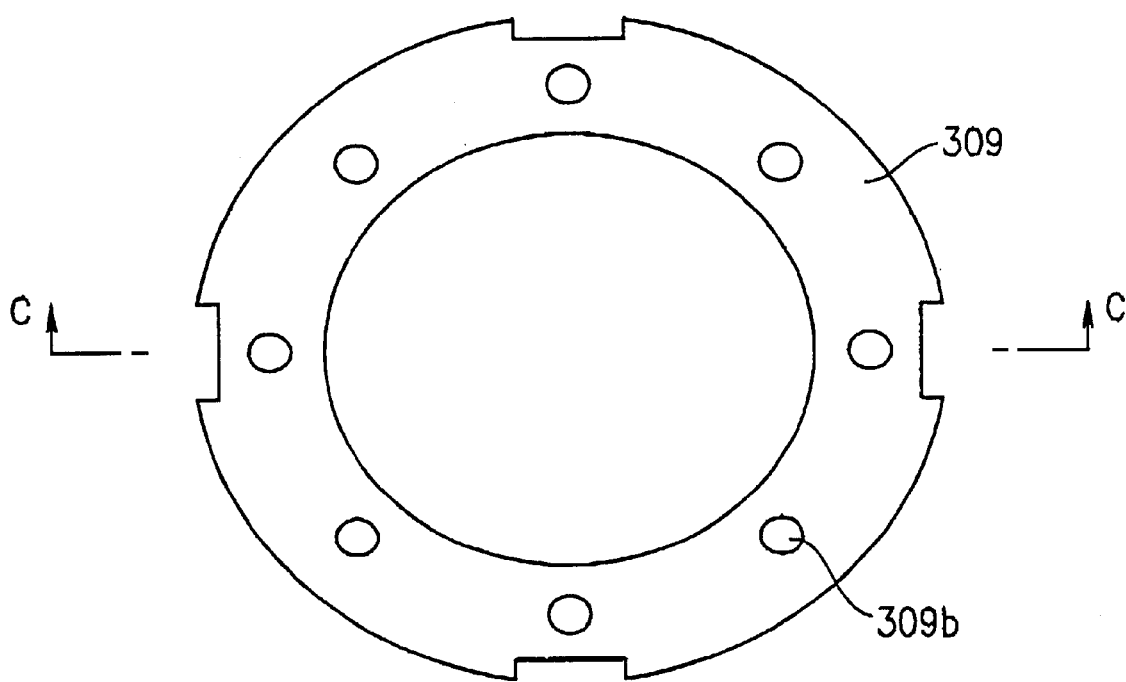
FIG. 5a is a magnified view of an upper washer of the torque limiter according to Example 1 of the present invention.
Figure 5B:
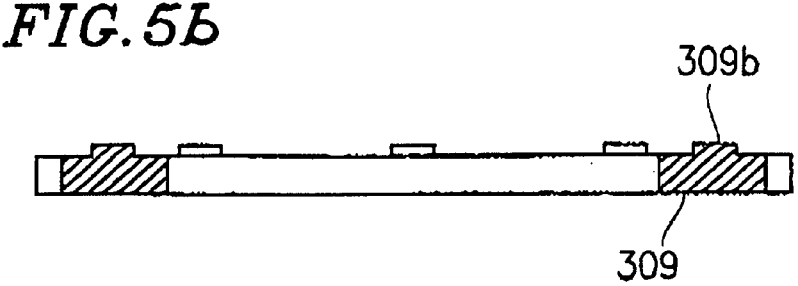
FIG. 5b is a cross-sectional view of the upper washer of FIG. 5a taken along the line C—C (FIGS. 5a and 5b being referred to collectively herein as FIG. 5)
Figure 9:
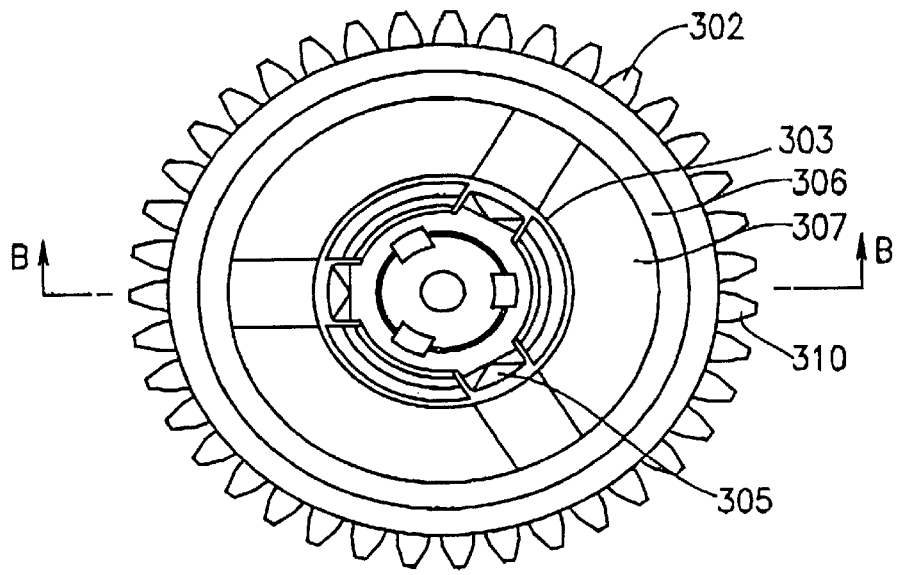
FIG. 9 is a top view of a conventional torque limiter.
Figure 10:
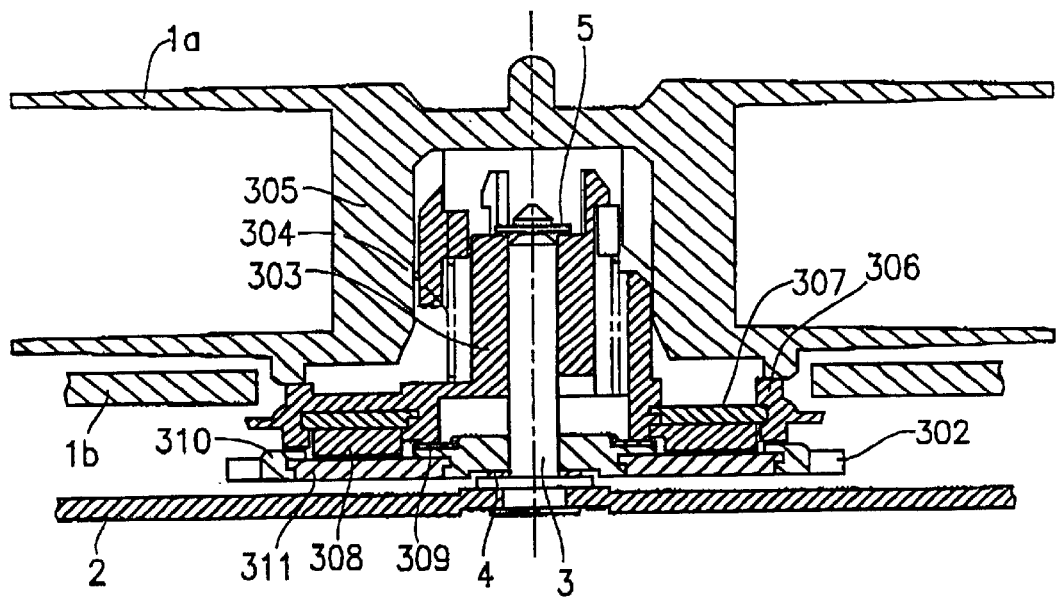
FIG. 10 is a cross-sectional view of the conventional torque limiter taken along line B—B shown in FIG. 9.
Figure 11:
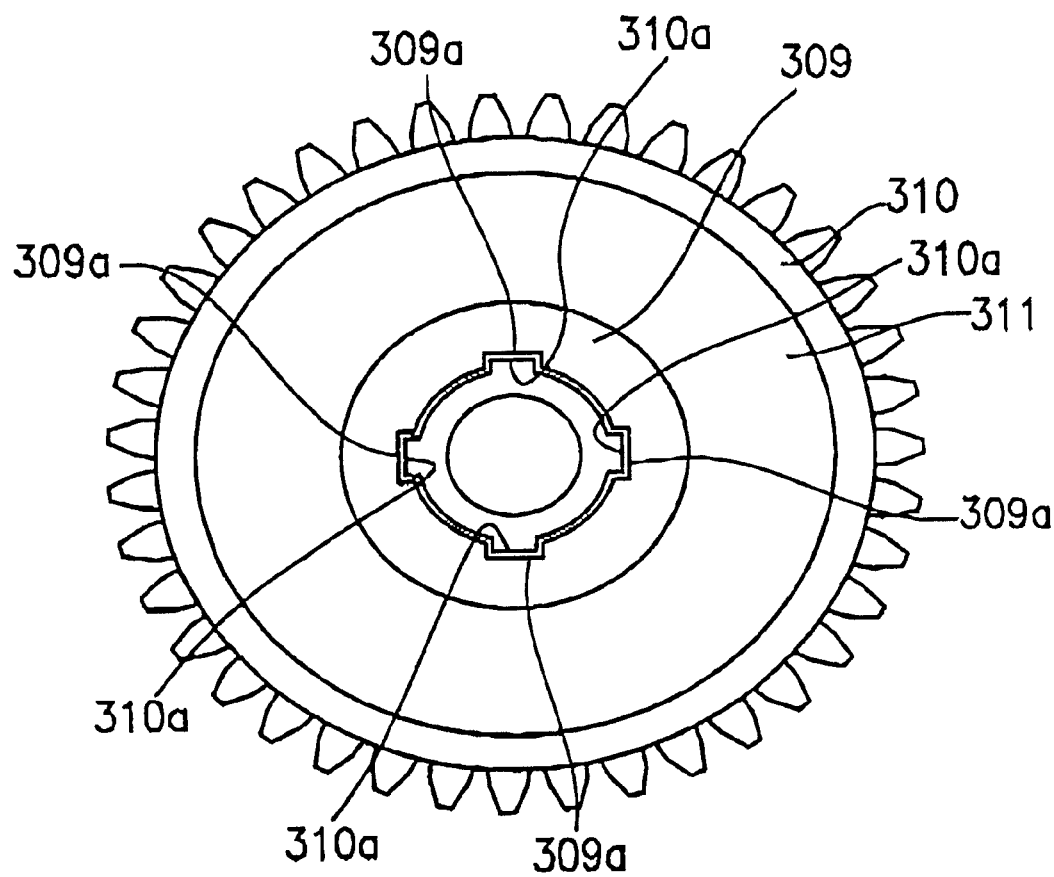
FIG. 11 is a top view of a lower reel mount member of the conventional torque limiter shown in FIG. 9.

FIG. 1 is a top view of a torque limiter according to Example 1 of the present invention. FIG. 2 is a cross sectional view of the torque limiter according to Example 1 of the present invention taken along line A—A shown in FIG. 1. FIG. 3 is a backside view of an upper reel mount member of the torque limiter according to Example 1 of the present invention. FIG. 4 is a top view of a lower reel mount member of the torque limiter according to Example 1 of the present invention. FIG. 5 is a magnified view of an upper washer of the torque limiter according to Example 1 of the present invention, showing both a top view and a cross-sectional view taken along line C—C shown in the top view of the upper washer. In FIGS. 1 through 5, components having the same functions and names as those shown in FIGS. 9 through 11 are denoted by the same reference numerals.

The "torque limiter" described herein is a reel mount on which a reel in a cassette is mounted, the torque on the reel when mounted being limited (controlled) by the torque limiter. As such, the terms "torque limiter" and "reelmount" are interchangeably used in this description.

In FIG. 2, reference numeral 1a denotes a reel in a cassette. A (magnetic) tape (not shown) is wound around the reel 1a. Reference numeral 1b denotes a body of the cassette, reference numeral 2 denotes a chassis of a magnetic recording/reproducing apparatus, such as a videotape or audiotape recorder, used for recording/reproducing information to/from the magnetic tape of the cassette, and reference numeral 3 denotes a rotation shaft provided in the chassis 2. For example, the rotation shaft 3 can be integrally formed with the chassis as shown in FIG. 2. The torque limiter according to Example 1 of the present invention is placed on the rotation shaft 3 so as to be rotatable with respect to an axis of the rotation shaft 3 (shown as a broken line in FIG. 2). Reference numeral 303 denotes an upper reel mount member on which the reel 1a is mounted. Reference numeral 305 denotes a rotation engagement member which is movable up and down (i.e., in a direction parallel to the axis of the rotation shaft 3) and is engaged with the upper reel mount member 303 and the reel 1a along a rotation direction of the reel mount, reference numeral 304 denotes a spring which applies upward force to the rotation engagement member 305 with respect to the movement thereof such that the rotation engagement member 305 is engaged with a protruded portion of the upper reel mount member 303 and is supported by the upper reel mount member 303 and the spring 304, and reference numeral 307 denotes a yoke board provided in the form of a disk and made of a ferromagnet, such as a rolled steel board.

The yoke board 307 can be integrally formed with the upper reel mount member 303. It is common practice in the field of magnetic recording/reproducing apparatuses to integrally form a yoke board member, such as the yoke board 307, with an upper reel mount member, such as the upper reel mount member 303, by outsert molding. The upper reel mount member 303 integrally formed with the yoke board 307 is rotatable with respect to the axis of the rotation shaft 3. The integral upper reel mount member 303 and yoke board 307 together form a first rotor of the torque limiter according to the present invention. Reference numeral 308 denotes a magnet which applies magnetic force so that the magnet 308 is attached to and rotated with the yoke board 307 due to rotation of the upper reel mount member 303. Lines of magnetic force (not shown) generated by the magnet 308 form a magnetic loop passing through the yoke board 307.

Reference numeral 310 denotes a lower reel mount member (a second rotor). The lower reel mount member 310 can be integrally formed with a hysteresis board 311 having a disk-like shape. The hysteresis board 311 is made of a material having large magnetic hysteresis loss. It is common practice in the field of magnetic recording/reproducing apparatuses to integrally form a hysteresis board, such as the hysteresis board 311, with a lower reel mount member, such as the lower reel mount member 310, by outsert molding. Similar to the upper reel mount member 303, the lower reel mount member 310 integrally formed with the hysteresis board 311 is placed on the rotation shaft 3 so as to be rotatable with respect to the axis of the rotation shaft 3. That is, both the upper and lower reel mount member 303 and 310 are rotatable about a single center of rotation. The hysteresis board 311 is attracted by the magnetic force of the magnet 308. Reference numerals 309 and 312 respectively denote upper and lower washers sandwiched between the magnet 308 and the hysteresis board 311 so as to be in contact with one another. Reference numeral 302 denotes a gear member provided to the outer circumference of the lower reel mount member 310, which is engaged with an external gear (not shown).

As shown in FIG. 3, the upper (first) washer 309 is provided with engagement portions 309a at the outer circumference thereof. Each engagement portion 309a is engaged with a protrusion portion 308a provided on the magnet 308 such that the upper washer 309 is rotated with the upper reel mount member 303 due to the contact of the magnet 308 with the yoke board 307 which is integrally formed with the upper reel mount member 303.

As shown in FIG. 4, the lower (second) washer 312 is provided with engagement portions 312a at the inner circumference thereof. Each engagement portion 312a is engaged with a protrusion portion 310a provided on the lower reel mount member 310 such that the second washer 312 is rotated with the lower reel mount member 310. That is, the protrusion portions 308a and 310a of the magnet 308 and lower reelmount 310, respectively, interlock with the engagement portions 309a and 312a of the first and second washers 309 and 312, respectively.

The upper washer 309 is made of a resin-based material, such as polyethylene, UHMW (ultra high molecular weight) polyethylene, POM (polyacetal), FR, PET (polyethylene terephthalate), PA (polyamide), PPS (polyphenylene sulfide), PBT (polybutylene terephthalate), PI (polyimide), or PEEK (polyether etherketone). The lower washer 312 is made of a metal-based material, such as a stainless steel board, a cold-rolled steel board, or a nickel-plated cold-rolled steel board. As shown in FIG. 5, the upper washer 309 is also provided with a plurality of protrusions 309b. For example, the protrusions 309b may be cylindrical in shape.

Operation of the torque limiter according to Example 1 of the present invention is described below.

When the lower reel mount member 310 is rotated by the external gear through engagement with the gear member 302, friction torque is generated between the upper and lower reel mount members 303 and 310 via the upper and lower washers 309 and 312 due to the magnetic attraction generated by the magnet 308 on the lower and upper parts of the reel mount. Simultaneously, the hysteresis board 311 is rotated through the magnetic loop generated by the magnet 308, so that magnetic hysteresis torque is generated. The friction torque and magnetic hysteresis torque result in clutch torque between the upper reel mount member 303 and the lower reel mount member 310 so that the reel 1a mounted on the upper reel mount member 303 is rotated by the rotation engagement member 305 while sufficient tension is applied to the magnetic tape wound around the reel 1a.

As described above, according to Example 1 of the present invention, the plurality of protrusions 309b are provided on the upper washer 309 so that the surface of the upper washer 309 (i.e., the surface of the upper washer 309 on which the protrusions 309b are provided) partially contacts the surface of the lower washer 312, thereby preventing the upper washer 309 from becoming stuck to the lower washer 312. That is, a gap is provided between the surfaces of the upper and lower washers 309 and 312. Further, grease or oil accumulates around each protrusion 309b substantially in the gap between the upper and lower washers 309 and 312, and thus the grease or oil cannot be easily expended from between the upper washer 309 and the lower washer 312 during operation of the torque limiter according to Example 1 of the present invention. Furthermore, the upper and lower washers 309 and 312 are spaced due to the protrusions 309b, and thus, even if the upper and lower washers 309 and 312 become worn through a long-time use, the fragments of the upper and lower washers 309 and 312 can accumulate in the space between the upper and lower washers 309 and 312 provided by the protrusions 309b without being pressed against the contact surfaces of the upper and lower washers 309 and 312, thereby preventing the upper and lower washers 309 and 312 from being damaged and abnormally worn.

Further still, the upper washer 309 can be made of a resin-based material, such as polyethylene, UHMW polyethylene, POM, FR, PET, PA, PPS, PBT, PI and peek, which is soft and elastic, and has surfaces which are uneven and include cavities, and the lower washer 312 can be made of a metal-based material, such as a stainless steel board, a cold-rolled steel board or a nickel-plated cold-rolled steel board, which is rigid and stiff, and has surfaces which are even and flat. Thus, the upper washer 309 made of a resin-based material and the lower washer 312 made of a metal-based material are in contact with each other while being rotated, where the combination of these two kinds of materials having the above-described characteristics provides a stable coefficient of friction.

EXAMPLE 2

Figure 6A:
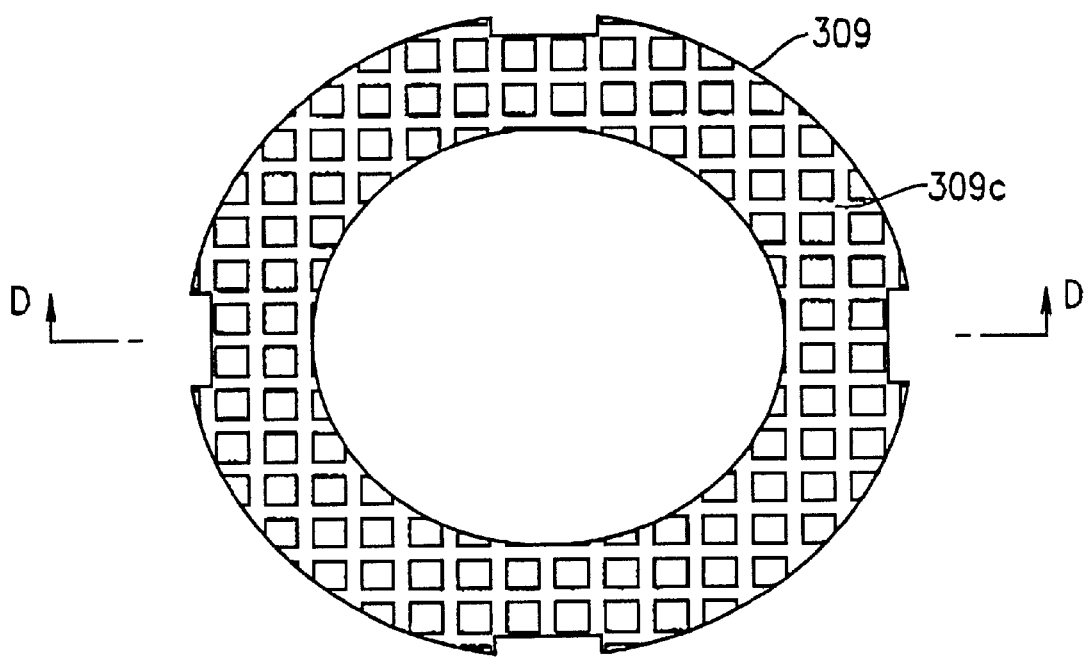
FIG. 6a is a magnified view of an upper washer of a torque limiter according to Example 2 of the present invention.
Figure 6B:
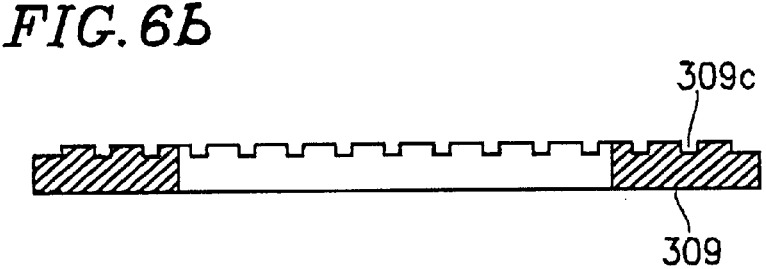
FIG. 6b is a cross-sectional view of the upper washer of FIG. 6a taken along the line D—D (FIGS. 6a and 6b being referred to collectively herein as FIG. 6)

FIG. 6 is a magnified view of an upper washer 309 of a torque limiter according to Example 2 of the present invention, showing both a top view and a cross-sectional view taken along line D—D shown in the top view of the upper washer 309. The upper washer 309 according to Example 2 of the present invention is provided with grooved depression portions 309c.

In the torque limiter according to Example 2 of the present invention having the above-described structure, the provision of the grooved depression portions 309c of the upper washer 309 realizes similar effects achieved by the cylindrical protrusions 309b according to Example 1 of the present invention.

EXAMPLE 3

Figure 7A:
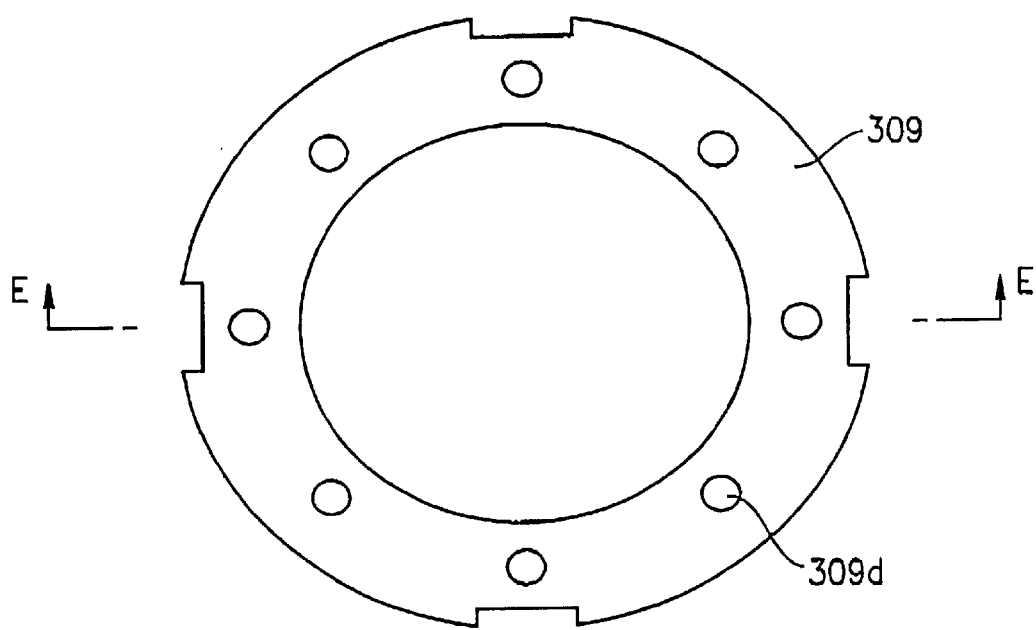
FIG. 7a is a magnified view of an upper washer according to Example 3 of the present invention.
Figure 7B:
FIG. 7b is a cross-sectional view of the upper washer of FIG. 7a taken along the line E—E (FIGS. 7a and 7b being referred to collectively herein as FIG. 7)

FIG. 7 is a magnified view of an upper washer 309 according to Example 3 of the present invention, showing both a top view and a cross-sectional view taken along line E—E shown in the top view of the upper washer 309. The upper washer 309 according to Example3 of the present invention is provided with circular holes 309d.

In the torque limiter according to Example 3 of the present invention having the above-described structure, the provision of the circular holes 309d of the upper washer 309 realizes similar effects achieved by the cylindrical protrusions 309b according to Example 1 of the present invention.

EXAMPLE 4

Figure 8A:
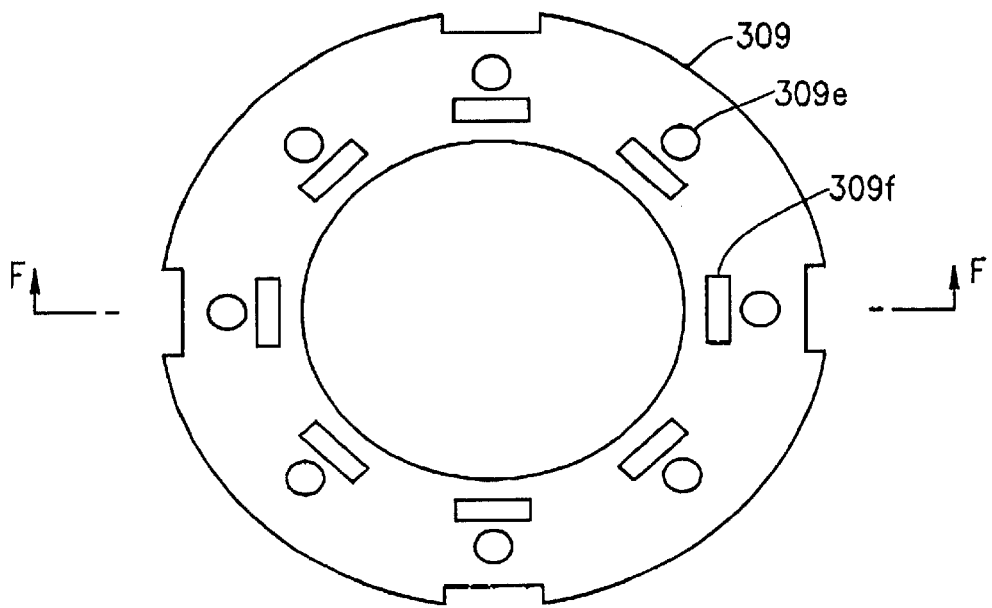
FIG. 8a is a magnified view of an upper washer according to Example 4 of the present invention.
Figure 8B:
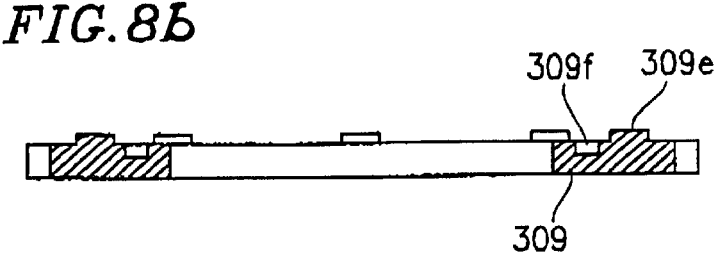
FIG. 8b is a cross-sectional view of the upper washer of FIG. 8a taken along the line F—F (FIGS. 8a and 8b being referred to collectively herein as FIG. 8)

FIG. 8 is a magnified view of an upper washer 309 according to Example 4 of the present invention, showing both a top view and a cross-sectional view taken along line F—F shown in the top view of the upper washer 309. The upper washer 309 according to Example 4 of the present invention is provided with cylindrical protrusions 309e and rectangular depression portions 309f.

In the torque limiter according to Example 4 of the present invention having the above-described structure, the provision of the cylindrical protrusion portions 309e and rectangular depression portions 309f of the upper washer 309 realizes similar effects achieved by the cylindrical protrusions 309b according to Example 1 of the present invention.

In Examples 1 through 4, although washers provided with various kinds of depression portions, protrusion portions, holes, or a combination thereof have been described, any shape of such depression portions, protrusion portions and holes other than those described in Examples 1 through 4 can be used.

In Example 4, although a combination of protrusions and depression portions is used, any combination of depression portions, protrusion portions and holes can be used.

Further, in Examples 1 through 4, although the upper washer 309 is provided with the depression portions, the protrusion portions, the holes, or combinations thereof, the lower washer 312 can be provided with the depression portions, the protrusion portions, the holes, or a combination thereof. Also, the depression portions, the protrusion portions, the holes, or combinations thereof can be formed on one or both sides of each of the upper and lower washers 309 and 312.

Furthermore, in Examples 1 through 4, although the upper washer 309 is made of a resin-based material and the lower washer 312 is made of a metal-based material, the upper washer 309 can be made of a metal-based material, such as a stainless steel board, a cold-rolled steel board, or a nickel-plated cold-rolled steel board, and the lower washer 312 can be made of a resin-based material, such as polyethylene, UHMW polyethylene, POM, FR, PET, PA, PPS, PBT, PI, or PEEK.

Further still, in Examples 1 through 4, although the torque limiter is provided with the upper washer 309 and the lower washer 312, the torque limiter can have a structure including either one of the upper washer 309 or the lower washer 312.

As described above, the present invention achieves an advantageous effect of providing a reliable torque limiter used for a magnetic recording/reproducing apparatus which includes a washer provided with depression portions, protrusion portions, holes, or combinations thereof, between first and second rotors, thereby generating stable clutch torque between the first and second rotors.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A torque limiter, comprising:
    a first rotor and a second rotor, the first and second rotors rotatable about a single center of rotation;
    a yoke board integrally formed with the first rotor;
    a magnet which is provided so as to be in contact with the yoke board; and
    a hysteresis board provided so as to be opposed to the magnet with a space therebetween,
    wherein the hysteresis board is integrally formed with the second rotor, and
    a washer having depression portions, protrusion portions, holes, or a combination thereof is provided between the first and second rotors.

2. A torque limiter according to claim 1, wherein first and second washers are provided between the first and second rotors and at least one of the first and second washers has depression portions, protrusion portions, holes, or a combination thereof on the surface of the at least one of the first and second washers.

3. A torque limiter according to claim 2, wherein the first washer is made of a resin-based material and the second washer is made of a metal-based material.

4. A torque limiter according to claim 2, wherein at least one of the first and second washers is made of any one of polyethylene, UHMW polyethylene, POM, FR, PET, PA, PPS, PBT, PI and PEEK.

5. A torque limiter according to claim 2, wherein grease or oil is provided between the first and second washers substantially in a gap provided between the surfaces of the first and second washers.

6. A torque limiter according to claim 1, wherein the magnet is provided with a protrusion portion which interlocks with an engagement portion of the washer so as to provide engagement of the washer with the first rotor through the contact of the magnet and the first rotor.

7. A torque limiter according to claim 2, wherein the second rotor is provided with a protrusion portion which interlocks with an engagement portion of the second washer so as to provide engagement of the second washer with the second rotor.

8. A torque limiter according to claim 1, wherein the torque limiter is provided on a rotation shaft in a chassis of a magnetic recording/reproducing apparatus for recording/reproducing information to/from a magnetic tape of a cassette, the first and second rotors being rotatable with respect to the rotation shaft.

* * * * *